United States Patent
Moudgill et al.

(10) Patent No.: US 8,732,382 B2
(45) Date of Patent: May 20, 2014

(54) HALTABLE AND RESTARTABLE DMA ENGINE

(75) Inventors: Mayan Moudgill, White Plains, NY (US); Shenghong Wang, Yorktown Heights, NY (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 13/057,469

(22) PCT Filed: Aug. 5, 2009

(86) PCT No.: PCT/US2009/052794
§ 371 (c)(1),
(2), (4) Date: Jul. 1, 2011

(87) PCT Pub. No.: WO2010/017263
PCT Pub. Date: Feb. 11, 2010

(65) Prior Publication Data
US 2011/0252211 A1 Oct. 13, 2011

Related U.S. Application Data

(60) Provisional application No. 61/086,631, filed on Aug. 6, 2008.

(51) Int. Cl.
*G06F 12/00* (2006.01)

(52) U.S. Cl.
USPC .................. 711/5; 711/165; 711/E12.068

(58) Field of Classification Search
None
See application file for complete search history.

(56) References Cited

U.S. PATENT DOCUMENTS

| 5,251,312 A | 10/1993 | Sodos |
| 5,325,489 A | 6/1994 | Mitsuhira et al. |
| 5,420,984 A | 5/1995 | Good et al. |

(Continued)

FOREIGN PATENT DOCUMENTS

| JP | 4306754 A | 10/1992 |
| JP | 5020263 A | 1/1993 |

(Continued)

OTHER PUBLICATIONS

Analog Devices, Inc. "Blackfin® Embedded Processor: Preliminary Technical Data ADSP-BF522/525/527." Rev. PrC, 2007.*

(Continued)

*Primary Examiner* — Matthew Bradley
*Assistant Examiner* — Daniel Bernard
(74) *Attorney, Agent, or Firm* — Knobbe Martens Olson & Bear LLP (57) ABSTRACT

A method is described for operation of a DMA engine. Copying is initiated for transfer of a first number of bytes from first source memory locations to first destination memory locations. Then, a halt instruction is issued before the first number of bytes are copied. After copying is stopped, a second number of bytes is established, encompassing those bytes remaining to be copied. After the transfer is halted, a quantity of the second number of bytes is identified. Quantity information is then generated and stored. Second source memory locations are identified to indicate where the second number of bytes are stored. Second source memory location information is then generated and stored. Second destination memory locations are then identified to indicate where the second number of bytes are to be transferred. Second destination memory location information is then generated and stored.

27 Claims, 9 Drawing Sheets

(56) References Cited

U.S. PATENT DOCUMENTS

| | | | |
|---|---|---|---|
| 5,481,756 A | 1/1996 | Kanno | |
| 5,497,501 A | 3/1996 | Kohzono et al. | |
| 5,623,622 A | 4/1997 | Yuki et al. | |
| 5,778,002 A * | 7/1998 | Werle | 370/474 |
| 5,822,553 A * | 10/1998 | Gifford et al. | 710/305 |
| 6,065,071 A | 5/2000 | Priem et al. | |
| 6,330,631 B1 * | 12/2001 | Crosland | 710/306 |
| 6,473,780 B1 | 10/2002 | Barcelo | |
| 6,629,213 B1 * | 9/2003 | Sharma | 711/144 |
| 6,842,848 B2 | 1/2005 | Hokenek et al. | |
| 6,889,278 B1 * | 5/2005 | Hoerler et al. | 710/266 |
| 6,904,511 B2 | 6/2005 | Hokenek et al. | |
| 6,912,623 B2 | 6/2005 | Hokenek et al. | |
| 6,925,643 B2 | 8/2005 | Hokenek et al. | |
| 6,968,445 B2 | 11/2005 | Hokenek et al. | |
| 6,971,103 B2 | 11/2005 | Hokenek et al. | |
| 6,990,557 B2 | 1/2006 | Hokenek et al. | |
| 7,251,737 B2 | 7/2007 | Weinberger et al. | |
| 7,380,114 B2 | 5/2008 | Sane et al. | |
| 7,428,567 B2 | 9/2008 | Schulte et al. | |
| 7,475,222 B2 | 1/2009 | Glossner et al. | |
| 7,593,978 B2 | 9/2009 | Schulte et al. | |
| 7,797,363 B2 | 9/2010 | Hokenek et al. | |
| 8,001,430 B2 * | 8/2011 | Shasha et al. | 714/42 |
| 2002/0062424 A1 * | 5/2002 | Liao et al. | 711/129 |
| 2002/0176430 A1 * | 11/2002 | Sangha et al. | 370/412 |
| 2004/0240486 A1 * | 12/2004 | Venkatesh et al. | 370/537 |
| 2004/0243739 A1 | 12/2004 | Spencer | |
| 2006/0095729 A1 | 5/2006 | Hokenek et al. | |
| 2007/0040788 A1 * | 2/2007 | Saha | 345/98 |
| 2007/0073925 A1 | 3/2007 | Lim et al. | |
| 2009/0193279 A1 | 7/2009 | Moudgill et al. | |
| 2009/0216917 A1 * | 8/2009 | Shasha et al. | 711/167 |
| 2009/0235032 A1 | 9/2009 | Hoane | |
| 2009/0276432 A1 | 11/2009 | Hokenek et al. | |
| 2010/0031007 A1 | 2/2010 | Moudgill | |
| 2010/0115527 A1 | 5/2010 | Kotlyar et al. | |
| 2010/0122068 A1 | 5/2010 | Hokenek et al. | |
| 2010/0138575 A1 * | 6/2010 | Noyes | 710/110 |
| 2010/0199073 A1 | 8/2010 | Hokenek et al. | |
| 2010/0199075 A1 | 8/2010 | Hokenek et al. | |
| 2010/0241834 A1 | 9/2010 | Moudgill | |
| 2010/0268892 A1 * | 10/2010 | Luttrell | 711/137 |
| 2010/0293210 A1 | 11/2010 | Sima et al. | |
| 2010/0299319 A1 | 11/2010 | Parson et al. | |
| 2011/0169848 A1 * | 7/2011 | Bratt et al. | 345/545 |
| 2011/0219150 A1 * | 9/2011 | Piccirillo et al. | 710/24 |
| 2011/0241744 A1 | 10/2011 | Moudgill et al. | |

FOREIGN PATENT DOCUMENTS

| | | | |
|---|---|---|---|
| JP | 6131294 A | 5/1994 | |
| JP | 9293044 A | 11/1997 | |
| JP | 9293045 A | 11/1997 | |
| JP | 11085671 A | 3/1999 | |
| JP | 11110338 A | 4/1999 | |
| JP | 2000227897 A | 8/2000 | |
| JP | 2000353146 A | 12/2000 | |
| JP | 2002251368 A | 9/2002 | |
| JP | 2006186480 A | 7/2006 | |
| JP | 2008097084 A | 4/2008 | |
| WO | WO 93/23810 | 11/1993 | |
| WO | WO 02/15015 | 2/2002 | |

OTHER PUBLICATIONS

A Method for Handling DMA greater than One Deep Preemption in One Deep Preemption DMA, IP.Com Journal, IP.Com Inc., West Henrietta, NY, US, May 29, 2007, XP013120721, ISSN: 1533-0001.

Supplementary European Search Report—EP09805483—Search Authority—Munich—Jun. 14, 2012.

Glossner et al., Sep. 2004, Sandblaster Low-Power Multithreaded SDR Baseband Processor, Proceedings of the 3rd Workshop on Applications Specific Processors (WASP'04), Stockholm, Sweden, pp. 53-58.

Balzola et al., Sep. 26, 2001, Design alternatives for parallel saturating multioperand adders, Proceedings 2001 International Conference on Computer Design, pp. 172-177.

Balzola, Apr. 2003, Saturating arithmetic for digital signal processors, PhD Thesis, Lehigh University.

Glossner et al, 2000, Trends in compilable DSP architecture, IEEE Workshop in Signal Processing Systems, pp. 1-19.

Glossner et al., Apr. 2001, Towards a very high bandwidth wireless battery powered device, IEEE Computer Society Workshop in VLSI, pp. 3-9.

Glossner et al., Nov. 2002, A multithreaded processor architecture for SDR, The Proceedings of the Korean Institute of Communication Sciences, 19(11):70-84.

Glossner et al., Nov. 11-12, 2002, Multi-threaded processor for software-defined radio, Proceedings of the 2002 Software Defined Radio Technical Conference, vol. 1, 6 pp.

Glossner et al., Jan. 2003, A software defined communications baseband design, IEEE Communications Magazine, 41(1):120-128.

Glossner et al., Sep. 22, 23, 2003, Multiple communication protocols for software defined radio, IEEE Colloquium on DSP Enable Radio, ISIL, Livingston, Scotland, pp. 227-236.

Glossner et al., Mar. 4, 2004, 6. The Sandbridge sandblaster communications processor, Software Defined Radio: Baseband Technologies for 3G Handsets and Basestations, John Wiley & Sons, Ltd., pp. 129-159.

Jinturkar et al., Mar. 31-Apr. 3, 2003, Programming the Sandbridge multithreaded processor, Proceedings of the 2003 Global Signal Processing Expo (GSPx) and International Signal Processing Conference (ISPC), Dallas, Tx.

Schulte et al., Nov. 19, 2000, Parallel saturating multioperand adders, Cases '00, pp. 172-179.

Schulte et al., Nov. 2004, A low-power multithreaded processor for baseband communication systems, Lecture Notes in Computer Science, 3133:393-402.

ISR and WO dated Sep. 23, 2009 in PCT/US09/52794.

IPRP dated Feb. 17, 2011 in PCT/US09/52794.

\* cited by examiner

HALTABLE AND RESTARTABLE DMA ENGINE

CROSS-REFERENCE TO RELATED APPLICATIONS

The present application is the U.S. National Phase of International Application PCT/US2009/0052794, filed Aug. 5, 2009, which claims priority benefit under 35 U.S.C. §119(e) to U.S. Provisional Patent Application Ser. No. 61/086,631, filed on Aug. 6, 2008, the contents of which are incorporated herein by reference.

FIELD OF THE INVENTION

This invention relates to Direct Memory Access ("DMA") engines. More particularly, the invention concerns an architected DMA that is part of the process state of a processor.

DESCRIPTION OF THE RELATED ART

Traditionally, DMAs have been treated as peripheral devices. As peripheral devices, DMAs have not been considered or treated as a part of the architected state for a processor, such as a personal computer, personal data assistant ("PDA"), cell phone, or other device that is processor-based and typically would include one or more DMAs.

Since DMAs traditionally have been excluded from the architected state of a processor, in a multi-programmed environment, the DMA engine is not considered a part of the process state. Accordingly, the DMA must be accessed via a monitor, possibly within the operating system.

Accessing a DMA separately from other components included in the architected state increases the latency to access the DMA. As should be appreciated by those skilled in the art, an increase in latency for a device like a DMA makes the DMA impractical for use in a process, especially when the process incorporates small moves or operations. Simply, for small operations, the latency time associated with traditional DMA architecture may so greatly increase the overall processing time for an operation, that reliance on the DMA is impractical.

As should be appreciated by those skilled in the art, there is always a need in the computer processing art to increase processing efficiency.

SUMMARY OF THE INVENTION

The invention offers at least one approach to increasing processing efficiency.

Specifically, the invention offers an architected DMA that is part of the process state. The DMA may be stopped and restarted, permitting a copy operation to be halted and resumed without a significant detrimental processing effect on the DMA.

The invention provides a method of operating a direct memory access engine. In the method, copying is initiated for a first number of bytes. The first number of bytes are to be copied from first source memory locations to first destination memory locations. After initiating the copying, a halt instruction is issued before the first number of bytes are copied. In response to the halt instruction, the copying is stopped. As a result, a second number of bytes is established. The second number of bytes are those bytes remaining to be copied from the first number of bytes. After the transfer is halted, a quantity of the second number of bytes is identified. Quantity information, which provides the quantity of the second number of bytes, is then generated and stored. Second source memory locations also are identified. The second source memory locations identify where the second number of bytes are stored. Second source memory location information is then generated and stored. Second destination memory locations are then identified. The second destination memory locations identify where the second number of bytes are to be transferred. Second destination memory location information is then generated and stored.

In one contemplated variation of this method, the quantity information, the second source memory location information, and the second destination memory location information are retrieved from at least one register in the direct memory access engine. One register or several registers may be used. Where there are several registers, one may be a source register, another may be a destination register. A third register may be a quantity register.

The method may also include resuming the halted transfer by initiating copying of the second number of bytes from the second source memory locations to second destination memory locations using the quantity information, the second source memory location information, and the second destination memory location information.

With respect to this method, there are a number of variations contemplated for re-initiating the copy operation after issuance of the halt instruction.

In one contemplated embodiment, the method provides for determining a next address to read from the second source memory location information and determining a next address to write from the second destination memory location information. Then, the method flushes all pending reads and writes. The method proceeds by determining, from the next address to read and the next address to write, a decrement value. The decrement value identifies a number of bytes by which the next address to read is in advance of the next address to write. The method then decrements the next address to read by the decrement value to generate a decremented read address. Copying the second number of bytes from the second memory locations to the second memory then destinations then proceeds based at least upon the decremented read address, the next address to write, and the quantity information.

In a second contemplated variation, the method includes determining a next address to read from the second source memory location information and determining a next address to write from the second destination memory location information. The method tracks the number of bytes by which the next address to read is in advance of the next address to write and establishes a run-ahead value. The run-ahead value is stored so that the next address to read may be adjusted by the run-ahead value. This permits generation of an adjusted next address to read. Copying then proceeds based at least upon the adjusted next address to read, the next address to write, and the quantity information.

In a third contemplated variation, the method contemplates determining a next address to read from the second source memory location information and determining a next address to write from the second destination memory location information. Copying of the second number of bytes from the second memory locations to the second memory destinations proceeds using the next address to read, the next address to write, and the quantity information.

In a fourth contemplated variation of the method, an identification of the first source memory locations, an identification of the first destination memory locations, and a count of the first number of bytes are retained. After retrieving the quantity information, a next address to read is established, at least based upon the identification of the first source memory locations, the count of the first number of bytes, and the quantity information. Then, a next address to write is established at least based upon the identification of the first destination memory locations, the count of the first number of bytes, and the quantity information. Copying of the second number of bytes from the second memory locations to the second memory destinations relies at least upon the next address to read, the next address to write, the count of the first number of bytes, and the quantity information.

In a fifth contemplated variation, an indication of the next address to write is retained. After issuance of the halt instruction, reading of the first number of bytes from the first source memory locations is stopped. In addition, writing continues for any of the bytes that remain from the bytes read before stopping the reading. Then, a next address to read from the second source memory location information and a next address to write from the second destination memory location information are determined. Copying of the second number of bytes from the second memory locations to the second memory destinations relies at least upon the next address to read, the next address to write, and the quantity information.

Other aspects of the invention will be made apparent from the discussion that follows and from the drawings appended hereto.

BRIEF DESCRIPTION OF THE DRAWINGS

The invention is described in connection with drawings that illustrate one or more aspects, in which.

DESCRIPTION OF EMBODIMENT(S) OF THE INVENTION

The invention is described in connection with specific embodiments and examples detailed below. The invention, however, is not intended to be limited solely to the embodiments and examples discussed. To the contrary, the embodiments and examples are intended to define the broad scope of the invention. As should be appreciated by those skilled in the art, there are numerous equivalents and variations of the embodiments and examples that may be employed without departing from the scope of the invention. Those embodiments and variations are intended to be encompassed by the invention.

As a preliminary matter, and as should be appreciated by those skilled in the art, DMA engines are used to copy values from one location in memory to another. At their simplest, DMA engines copy values from some contiguous block of memory to some other block. One example of this basic copy function of a DMA engine is provided by Code Segment #1, below.

Code Segment #1

```
for(i=O;i<CNT;i++) {
    DST[i] = SRC[i];
}
```

To use a simple DMA from a processor, typically the processor writes the source address, destination address, and the transfer size to selected registers. The processor then initiates the transfer by writing to a control register. When all the values have been copied, the DMA signals the completion of the transfer by writing to a control and/or a status register and/or triggering an interrupt in the processor.

More sophisticated DMAs are capable of operations such as "scatter" operations. "Scatter" refers to an operation whereby a single procedure call sequentially reads data from a single data stream to multiple buffers. A scatter operation may be written in code as set forth in Code Segment #2, below.

Code Segment #2

```
for(i=O;i<CNT;i++) {
    DST [OFF[i]] = SRC[i];
}
```

"SRC" refers to the address of the source. "DST" refers to the address of the destination. "OFF" refers to the address of the offset array.

In one contemplated embodiment, a scatter operation takes data from a plurality of source memory locations and "scatters" the data to a number of destination memory locations. As indicated above, a scatter operation also may operate from a single data stream, which streams data from a plurality of source memory locations. If so, the scatter operation may include a number of data manipulations. Specifically, such a scatter operation may: (1) read a sequential data stream of data to be copied, (2) read a sequential address stream or an index stream, and (3) if using an index stream, create an address stream by adding each index to a single base address. Each element in the data may then be copied to a corresponding address in the stream. It is noted that these operations are not required for all scatter operations but are provided merely as guidance for those skilled in the art and to assist with an understanding of one aspect of the invention.

More sophisticated DMAs also are capable of specific operations, referred to as "gather" operations. "Gather" operations are those operations where a single procedure call sequentially writes data from a multiple buffers to a single data stream. A gather operation may be written in code as set forth in Code Segment #3, below.

Code Segment #3

```
for(i=O;i<CNT;i++) {
    DST[i] = SRC [OFF[i]];
}
```

As with Code Segment #2, "SRC" refers to the address of the source. Similarly, "DST" refers to the address of the destination. Additionally, "OFF" refers to the address of the offset array.

With respect to "gather" operations, the information may be gathered from a plurality of source memory locations. The data may then be provided to a plurality of destination memory locations, perhaps via a scatter algorithm. Alternatively, the data may be gathered and funneled to a single data stream for further processing. As should be appreciated by those skilled in the art, a gather operation does the opposite of a scatter operation, at least in some ways. For example, a gather operation may: (1) read either an address stream or a an index stream and generate an address stream by adding it to a base, or (2) read the data from the locations in the address stream, creating a sequential data stream. The sequential data stream may then be copied sequentially to the destination(s). This discussion is provided to clarify at least this one aspect of the invention. It is not intended to be limiting of the invention.

In addition, more sophisticated DMAs are capable of "multi-level" operations. Multi-level operations are those where data from multiple sources are read from and/or written to multiple destinations. A multi-level operation may be written in code as set forth in Code Segment #4, below.

Code Segment #4

```
for(i=O;i<CNTO;i++) {
    for (j=O; j<CNTl; j++)
        DST[i] [j] = SRC[i] [j];
    }
}
```

As with Code Segments ##2 and 3, "SRC" refers to the address of the source. "DST" refers to the address of the destination. "OFF" refers to the address of the offset array.

Scatter, gather, and multi-level operations may be combined to generate still further functions, as should be appreciated by those skilled in the art. Accordingly, further details concerning these functions are not provided here.

Context Switch

Once again with reference to the typical DMA engine, after the engine initiates a transfer, the engine runs to completion. The DMA engine then signals the processor that the transfer has been completed. Following this, the DMA engine executes a second transfer. The process is repeated as needed. As should be appreciated by those skilled in the art, this is but one way to describe the operation of a DMA engine.

There are other ways to setup DMAs and series of DMAs. For example, some DMAs support the use of "shadow registers". A shadow register permits a DMA to be programmed with the next transfer while the current DMA transfer is "in-flight" or in process. The shadow register, therefore, facilitates the next transfer because the DMA may start the next transfer as soon as the current transfer is completed. Other DMAs support "chaining". This approach differs from the shadow register approach. Instead of programming the DMA directly, a control block is written with the details of the transfer. The next transfer is written to a control block, and a location in the first control block is set to point to this next transfer. In this manner, a chain of transfers may be established. As soon as the DMA completes the transfer determined by a control block, it proceeds to execute the transfer determined by the next block in the chain.

As should be apparent to those skilled in the art, these alternative set-ups also suffer from the same problems noted with respect to DMAs generally. In particular, DMAs are not well suited to execute all types of operations because of several deficiencies, including the aforementioned latency issues. For example, the existing architecture for DMAs provides no mechanism to suspend an ongoing transfer, to program and execute a new transfer, and then to resume the suspended transfer. In addition, if multiple sources try to program a DMA engine, these sources must coordinate efforts to the DMA engine to prevent simultaneous access or to prevent multiple instructions from overwriting one another.

To facilitate understanding of the deficiencies in the prior art with respect to DMAs, the following example is provided. Specifically, the example encompasses an instance where the DMA is to be used to execute data transfers on a general purpose processor. To simplify the example, it is assumed that all memory accesses are in a real-mode. Real-mode operation is assumed to avoid the complications that arise when programming for virtual memory, as should be understood by those skilled in the art. Specifically, by ignoring virtual memory in this example, the complications introduced by virtual memory translation are also avoided. For this example, several problems arise, as detailed below.

The first problem may arise in the context of a transfer process that is interrupted and the context is switched to another transfer operation. Specifically, if the transfer process is interrupted during the interval when the DMA is being programmed but before the DMA writes to the control register, the DMA registers must be saved as part of the process state. As a result, before the transfer operation may be resumed, the DMA registers must be recreated (or "written back" to the appropriate addresses).

The second problem that may arise concerns processes that program long-running DMAs. As may be immediately apparent, when a process programs a long-running DMA and the process is then context-switched, the new process must await completion of the first transfer process before being executed. As a result, the execution of the first transfer operation stalls the execution of the second transfer operation.

A third problem that may arise with respect to DMA processing arises in the context of a multi-threaded or multi-processor environment. Specifically, in a multi-threaded or multi-processor machine, multiple processes simultaneously may try to reprogram the DMA. Since only one process may proceed at any given time, the multiple processes require execution of a mutual exclusion algorithm. As should be appreciated by those skilled in the art, mutual exclusion algorithms increase the latency period associated with programming the DMA.

The fourth problem that may arise concerns the generation of an interrupt signal by the DMA, which may be issued at the conclusion of a transfer operation. Specifically, when a DMA signals completion of a transfer operation by means of an interrupt, there is no guarantee that the process that programmed the DMA is the currently-running process. Consequently, when issued, the completion interrupt must be captured by a shared interrupt handler, which decides if the currently-running process is the process to which the interrupt must be delivered.

If the processor uses virtual memory, additional problems arise, because the DMA engine must translate between virtual and real addresses. It is contemplated that the operating system may be employed to translate the desired transfer into real addresses, and pin the source and target pages. However, reliance on the operating system for this translation dramatically increases the latency to initiate a DMA. Lighter-weight schemes (i.e., less latency-burdened schemes) typically rely on virtual addresses in the DMA. These schemes run the DMA transfer addresses through the processor's translation mechanism for operation. A problem with this approach is that, after a context switch, the processors translation mechanism may not be valid for the previous process. As a result, there must be a method for stopping the DMA to avoid conflicts in processing.

Each of these problems present challenges in the execution of transfer operations by a DMA. The invention offers solutions for these problems.

Restartable Stop

The present invention offers a restartable stop of a block-transfer DMA. A restartable stop of a block-transfer DMA is one where it is possible to stop the DMA in mid-transfer. Once the transfer has been stopped, it is then possible to determine: (1) how many bytes are left to be transferred, (2) the address of the next byte to be read, and (3) the address of the next byte to be written. This approach may be implanted simply by reading the control registers of the DMA. Other possible implementations are also contemplated.

Simple

The first variation presented by the invention is referred to as the "simple" implementation. In the simple implementation, copies of the initial values of the source, destination, and byte count are retained, along with a count of the number of the written bytes. Since this information is retained, a restart state of the DMA transfer operation may be determined by adding and/or subtracting the initial values to or from the transferred byte count. As should be appreciated by those skilled in the art, this simple approach is inefficient. One reason for this inefficiency is that the implementation of the DMA requires the system to keep track of the next byte to read and/or to write.

Drain

The second variation presented by the invention is referred to as the "drain" implementation. In this implementation, the DMA keeps a running count of the next address to read and/or to write. The DMA also keeps track of the number of bytes remaining to be read. When stopped mid-transfer, the DMA stops reading and waits for the bytes that have already been read to be written to memory. Once the bytes have been written to memory, the DMA is placed into a restartable state, from which the DMA may complete the transfer operation. As should be apparent, this implementation suffers from at least one disadvantage. Specifically, all pending reads must be written before the DMA is in a restartable state. This arrangement is likely to result in latencies during execution of the transfer operation.

Early Stop

The third variation presented by the invention is referred to as the "early stop" implementation. In this implementation, the DMA keeps a running count of the next address to read and/or to write. The DMA also retains the number of bytes left to write. When the DMA is stopped mid-transfer, the DMA stops writing and flushes all pending reads and/or writes. Generally, in this embodiment, the read address runs ahead of the write address (i.e., more bytes have been read than written). Consequently, the read address must be decremented by the amount of bytes that the read address is ahead of the write address. This approach does not suffer from the kinds of disadvantages discussed in connection with the first two approaches and, therefore, is proffered as one attractive approach for implementation of the present invention.

Run-Ahead

The fourth variation is referred to as the "run-ahead" implementation. This implementation is similar to the early stop implementation, except that a separate register (i.e., an extra register) is used to keep track of how far the read address is ahead of the write address (i.e., the difference between the number of bytes read and written). This value is referred to as the "run-ahead" value. Since the run-ahead value is generally small, the extra register may be implemented fairly easily and cheaply. In other words, although the extra register is required for the run-ahead approach, the additional register does not add significantly to the overall "cost" associated with operation of the DMA. In this implementation, to recover the restart state, the processor subtracts the run-ahead value from the read address to obtain the correct restart read address.

Offset State

As discussed above, DMAs may implement both scatter and gather operations. When a DMA is engaged in a scatter and/or a gather, the reading of the offsets tends to run ahead of the reads and/or writes of the data. To recover the restart state of the offset, then, it is necessary to use some variation of the early stop or run-ahead techniques described above.

Architected Registers

Traditionally, DMAs have been treated as peripherals, and consequently, the DMA registers have been accessed either through load and/or store operations or through special input and/or output instructions.

Since one goal of the invention is to make the DMA a part of the processor context, the DMA registers part are made a part of the architected register state of the processor. In the invention, the DMA registers are special-purpose registers accessible through the same instructions as other special purpose registers.

With respect to the various embodiments of the invention discussed above, reference is now made to the figures appended hereto. With respect to the figures, it is possible that any of the operations identified may encompass one or more steps. Moreover, different operations may be combined into a single step in some instances. These possibilities are intended to be encompassed by the invention.

Figure 1:
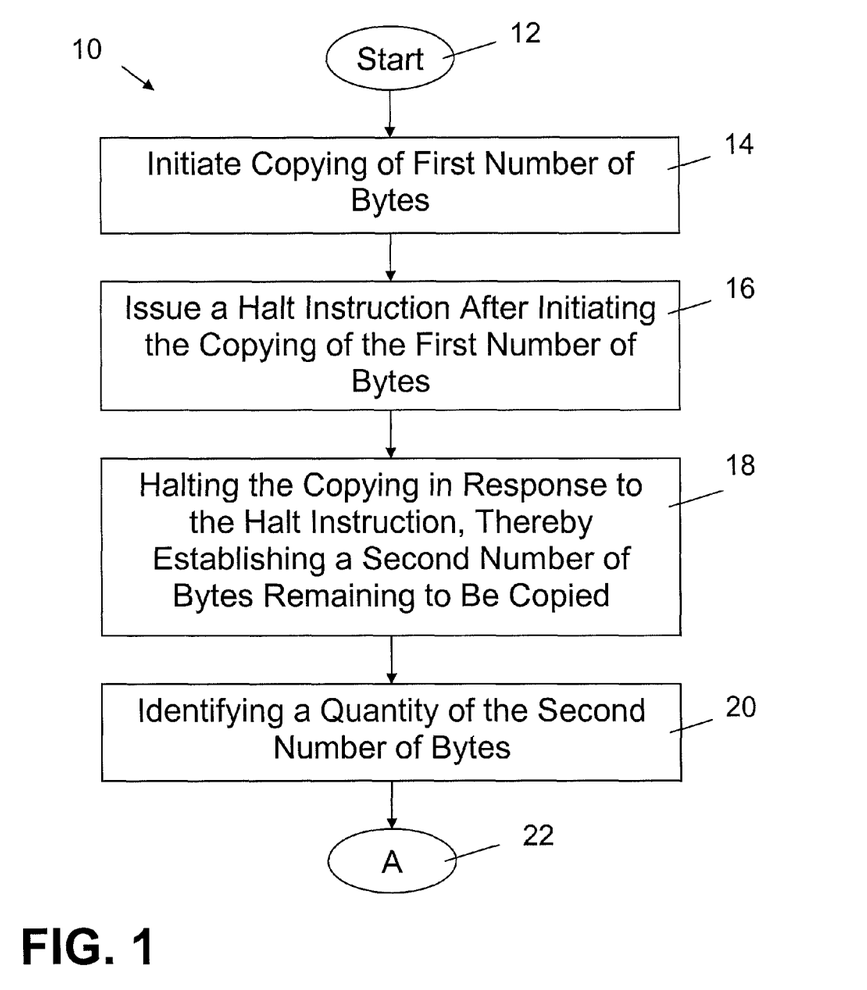
FIG. 1 is a first portion of a flow diagram illustrating one embodiment of the method contemplated by the invention.

FIG. 1 is a flow diagram outlining the fundamental method of the invention. For reference, the method is provided with the reference identifier 10. The method 10 is contemplated to be executed on a processor, such as a DMA engine. The method begins at 12. After the start 12, the method 10 proceeds to 14, where copying is initiated for a first number of bytes from first source memory locations to first destination memory locations. After initiating the copying at 14, a halt instruction is issued at 16 before the first number of bytes are copied from the first source memory locations to the first destination memory locations. At 18, in response to issuance of the halt instruction at 16, the copying is halted, thereby establishing a second number of bytes, which comprise those bytes remaining to be copied from the first number of bytes. Then, at 20, a quantity of the second number of bytes is identified. FIG. 1 includes a transition block 22, which indicates that the method continues in FIG. 2.

Figure 2:
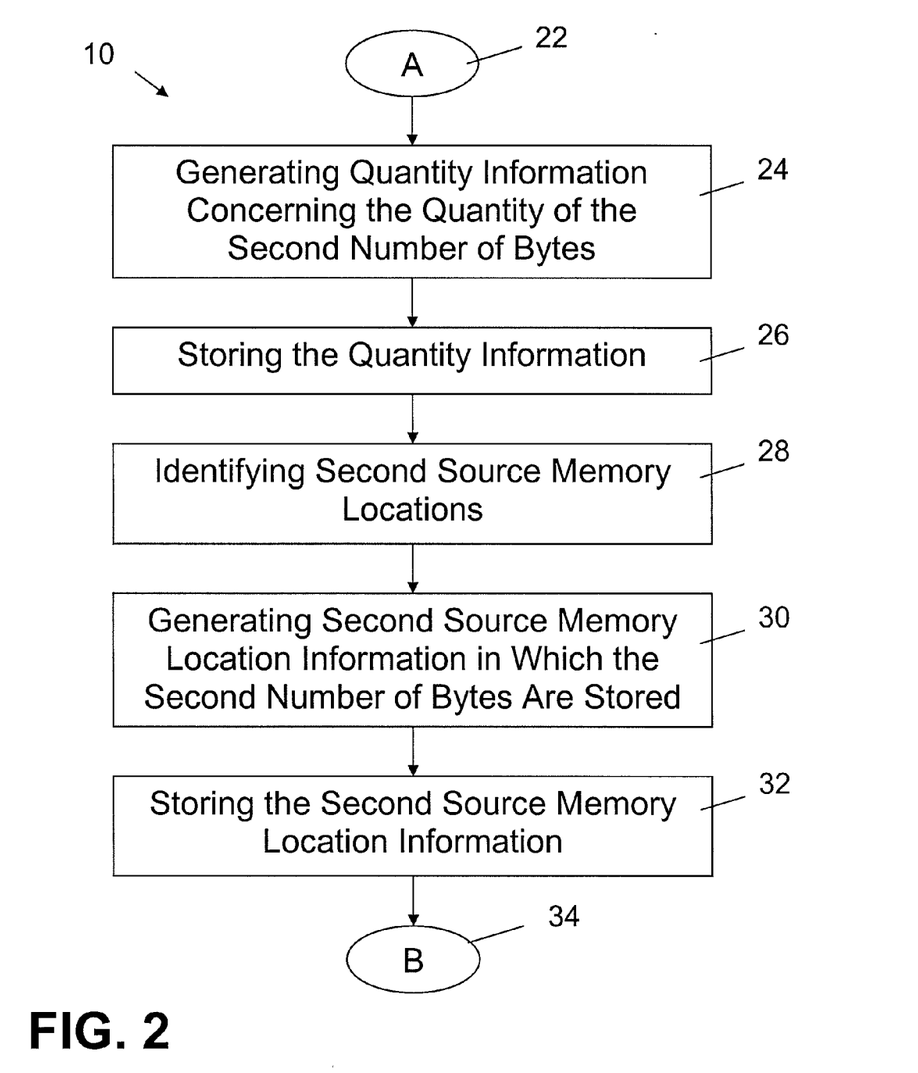
FIG. 2 is a second portion of a flow diagram illustrating the method begun in FIG. 1, this figure being a continuation of the portion of the method illustrated in FIG. 1.

FIG. 2 provides the continuation of the method illustrated in FIG. 1. Specifically, once the quantity is identified, quantity information is generated concerning the quantity of the second number of bytes at 24. This quantity information is then stored at 26. From 26, the method proceeds to 28 where the second source memory locations are identified. The second source memory locations encompass the locations where the second number of bytes are stored. From 28, the method 10 proceeds to 30 where second source memory location information is generated. As should be apparent, the second source memory location information encompasses the second source memory locations in which the second number of bytes are stored. Then, at 32, the second memory source location information is stored. FIG. 2 includes a transition block 34, which indicates that the method 10 continues to FIG. 3.

Figure 3:
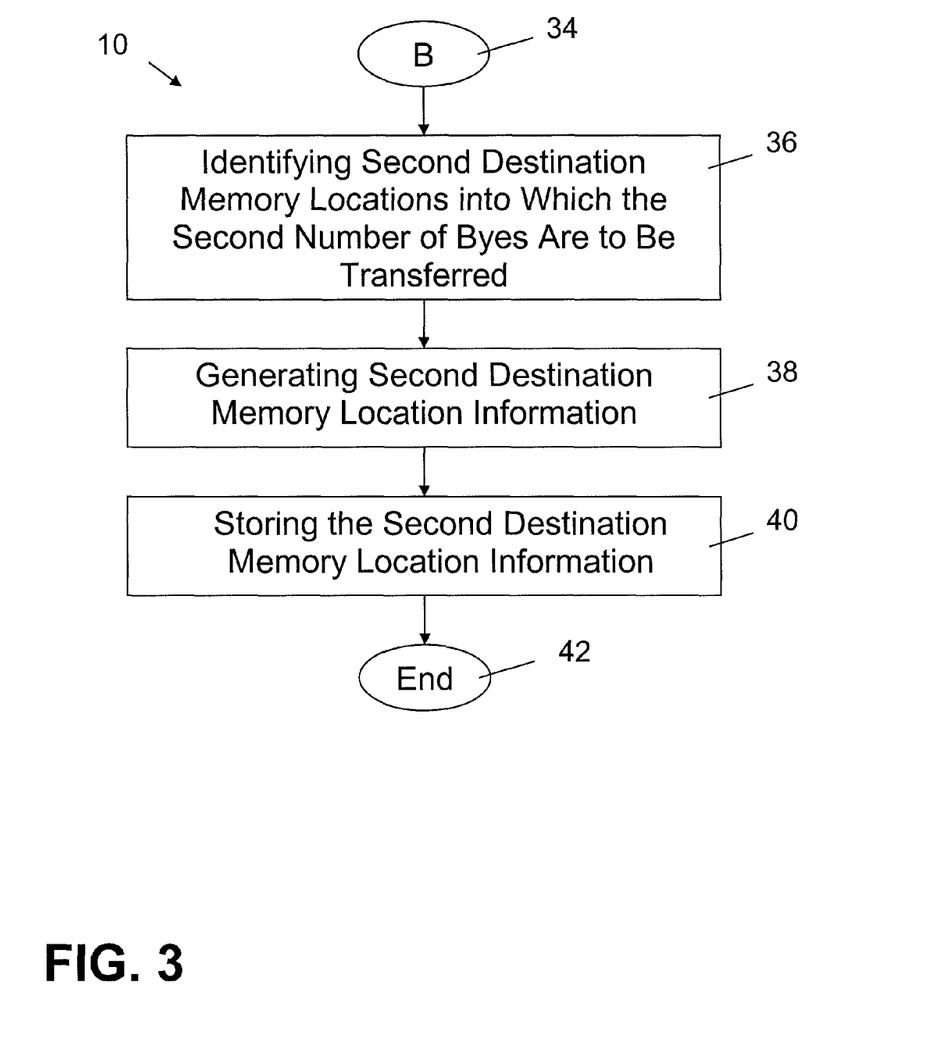
FIG. 3 is a flow a third portion of a flow diagram illustrating the method begun in FIG. 1, this figure being a continuation of the portion of the method illustrated in FIG. 2.

FIG. 3 illustrates the remainder of the method 10. In FIG. 3, the method 10 continues from 32 where second destination memory locations are identified at 36. The second destination memory locations encompass the destinations into which the second number of bytes are to be transferred. From 36, the method 10 continues to 38. At 38, second destination memory location information is generated. The second destination memory location information encompasses the second destination memory locations into which the second number of bytes are to be stored. The method 10 then proceeds to 40 where the second destination memory location information is stored. The method 10 ends at 42.

As may be appreciated from FIGS. 1-3, method 10 encompasses operations that form a basic halt operation of a DMA engine. In order to resume the transfer of the bytes from the source locations to the destination locations, further processing is required. FIGS. 4-9 detail different embodiments and aspect of the invention that are directed to the restart operation.

As a preliminary matter, the various embodiments of the restart operation encompass a continuation of the halted copying process. In this regard, the copying process continues as before. In the resumed copying operation, the second bytes are copied from the source locations to the destination locations. How the copying is resumed underlies aspects of the embodiments that are described in connection with FIGS. 4-9.

Figure 4:
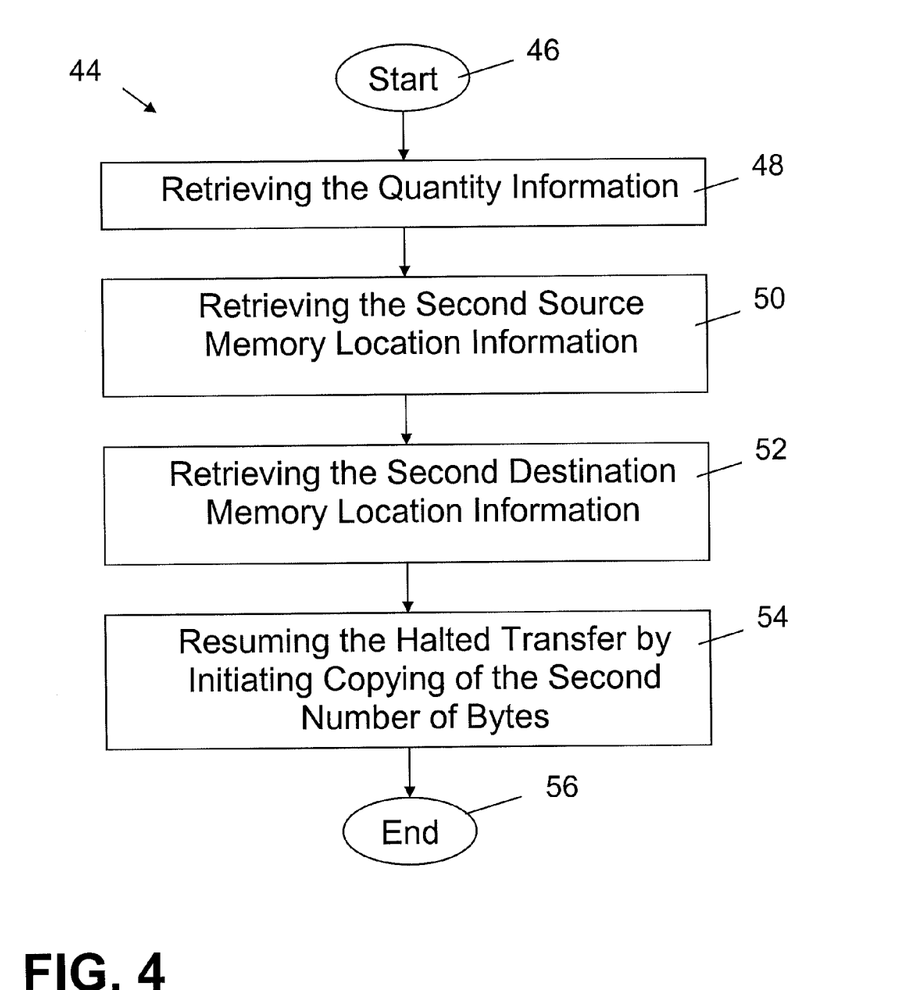
FIG. 4 is a flow diagram illustrating additional operations that may be included in the method illustrated in FIGS. 1-3.

FIG. 4 provides for retrieval of specific information for operation of the DMA engine when the DMA engine resumes the copying operation after issuing the halt instruction at 16. Specifically, FIG. 4 illustrates a flow chart for a method 44 that starts at 46. The method 44 is contemplated to be a continuation of the method 10, as should be apparent to those skilled in the art. In the method 44, the quantity information is retrieved at 48. Then, at 50, the second source memory location information is retrieved. Following this, the second destination memory location information is retrieved at 52. As should be appreciated by those skilled in the art, once the DMA engine retrieves these three pieces of information, the DMA engine may proceed to resume the halted copying operation detailed in FIGS. 1-3.

For the method 44, it is contemplated that the quantity information, the second source memory location information, and the second destination memory location information are read from at least one register in the direct memory access engine. Since the three types of information are being retrieved from a register, the DMA engine is not required to access a memory location. As a result, the DMA engine may proceed more rapidly to resume the halted copying operation than it would if memory locations were to be accessed. As should be apparent to those skilled in the art, efficient processors are designed to avoid memory accesses, where prudent. Access to memory typically accounts for the longest delays when executing instructions.

As noted above, the quantity information, the second source memory location information, and the second destination memory location information may be read from at least one register. In one contemplated embodiment, the three types of information may be read from a single register. However, other variations are also contemplated. For example, several registers may be employed. This includes two or more registers. The two or more registers may include at least one source register in which the first source memory locations are retained and at least one destination register in which the first destination memory locations are retained. In addition, the two or more registers may encompass a quantity register in which the quantity information is retained.

Returning to FIG. 4, once the quantity information, the second source memory location information, and the second destination memory location information are retrieved from the register or registers, the method proceeds to 54 where the halted transfer is resumed by initiating copying of the second number of bytes from the second source memory locations to second destination memory locations using the quantity information, the second source memory location information, and the second destination memory location information. The method 44 then ends at 56.

As noted in the discussion above, there are several different embodiments by which copying of the bytes from the source locations to the destination locations may be made once the copying operation is resumed. The first embodiment refers the "early stop" method 58. A flow chart for the early stop method 58 is provided in FIG. 5. It is noted that the name "early stop method" is provided merely to distinguish the first embodiment from other embodiments contemplated to fall within the scope of the invention. The name is not intended to be limiting of the method 58. Moreover, while reference is made to other embodiments also by a specific name, the names are not intended to be limiting of the invention. The names are being used merely to facilitate understanding of the invention.

Figure 5:
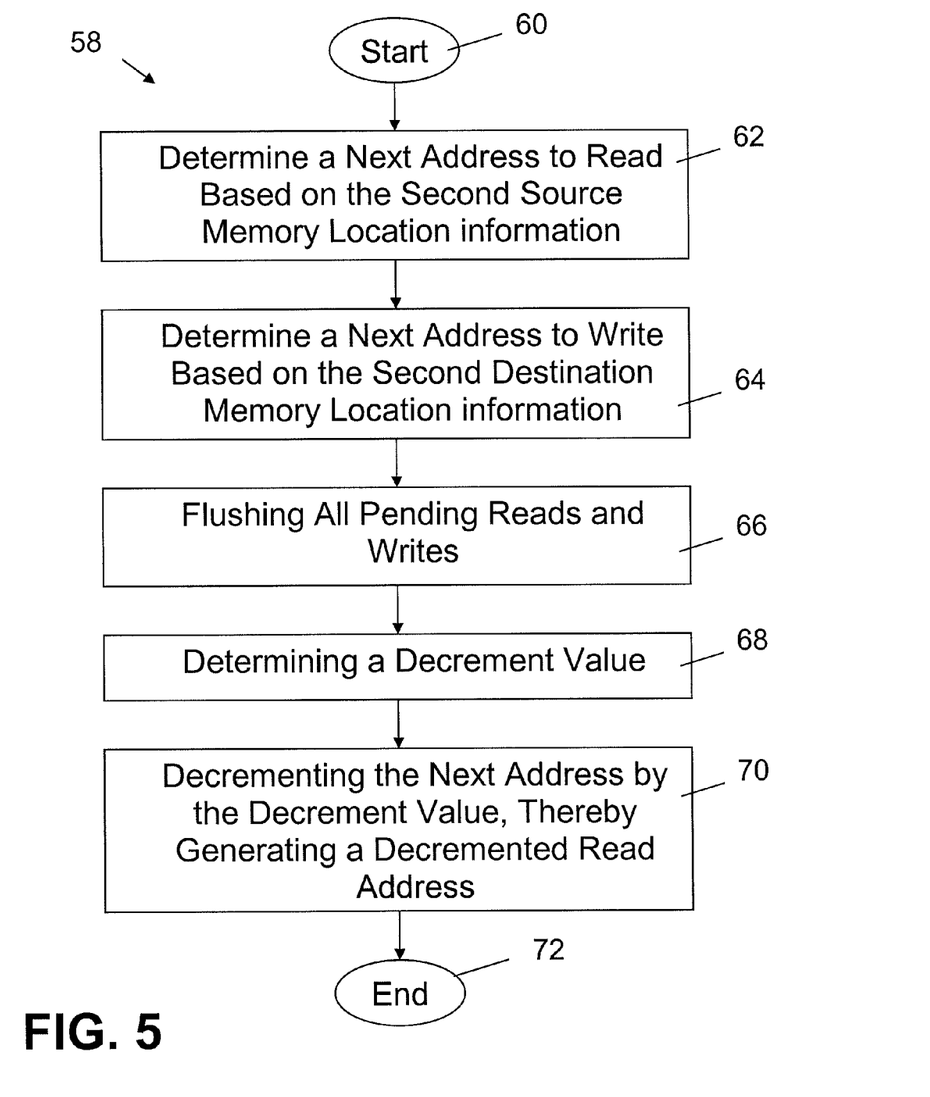
FIG. 5 is a flow diagram illustrating a first contemplated variation of the method illustrated in FIGS. 1-3.

With reference to FIG. 5, the early stop method 58 is intended to continue after the retrieval of the quantity information, the second source memory location information, and the second destination memory location information. These three operations are discussed at 48, 50, and 52 in connection with the discussion of FIG. 4.

The method 58 begins at 60. From 60, the method 58 proceeds to 62, where a next address to read from the second source memory location information is determined. The method 58 then proceeds to 64 where a next address to write from the second destination memory location information is determined. All pending reads and writes are then flushed at 66. This means that all of the pending reads and writes are deleted. From 66, the method 58 proceeds to 68, where a decrement value is determined from the next address to read and the next address to write. The decrement value identifies a number of bytes by which the next address to read is in advance of the next address to write. At 70, the next address to read is decremented by the decrement value, thereby generating a decremented read address. Once this decrement read address is determined, the copying operation may resume. Specifically, the second number of bytes may be copied from the second memory locations to the second memory destinations based at least upon the decremented read address, the next address to write, and the quantity information. The method 58 ends at 72.

Figure 6:
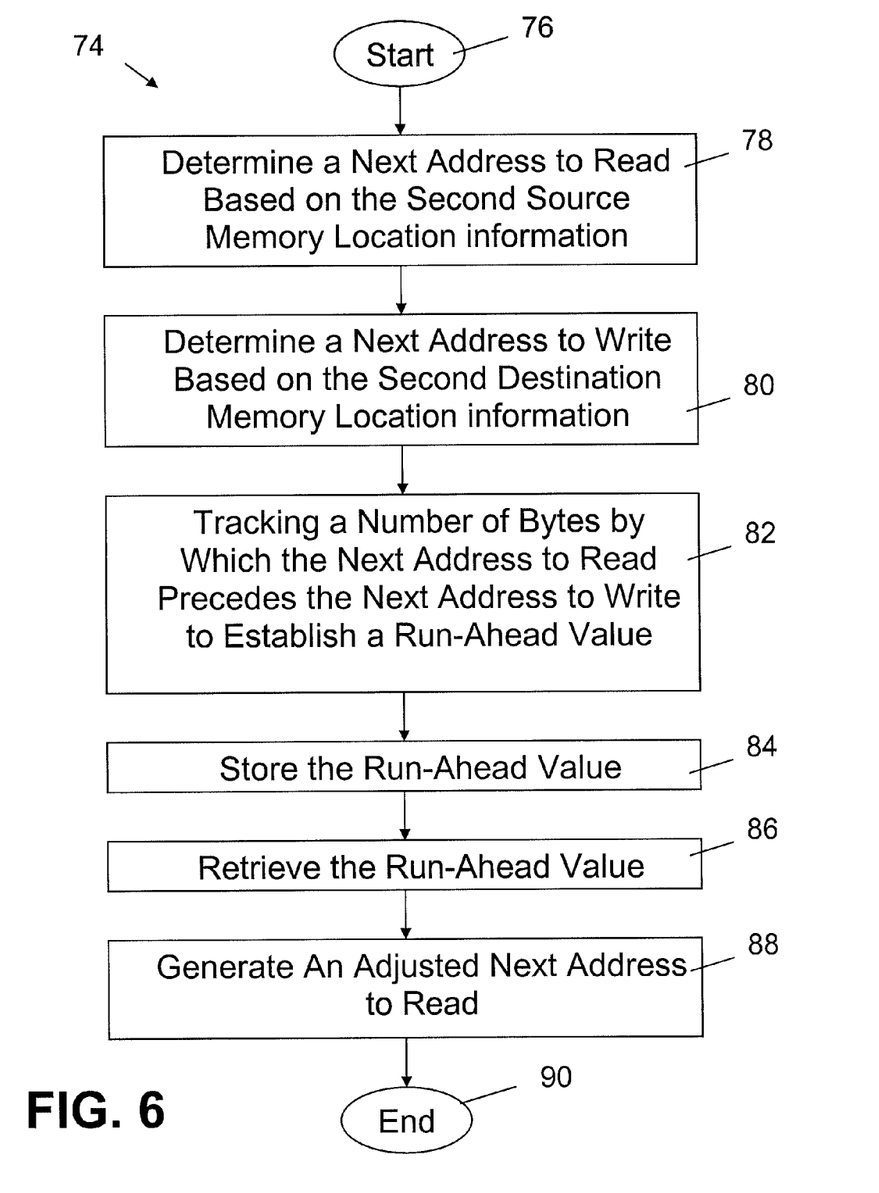
FIG. 6 is a flow diagram illustrating a second contemplated variation of the method illustrated in FIGS. 1-3.

FIG. 6 illustrates a method 74, which is referred to as the "run-ahead" method". The run-ahead method 74 also is intended to initiate after the operation 52 that is detailed in FIG. 4. The run-ahead method 74 begins at 76. The method 74 then proceeds to 78 where a next address to read from the second source memory location information is determined. Then, at 80, a next address to write from the second destination memory location information is determined.

In the method 74, tracking is provided for a run-ahead value. The run ahead value is the number of bytes by which the next address to read is in advance of the next address to write. By tracking this information, a run-ahead value may be established at 82. The run-ahead value is stored at 84. So that the DMA engine may resume the copying operation, the run-ahead value is retrieved at 86. Obviously this operation occurs at a subsequent time, when it is appropriate to resume the copying operation. Finally, at 88, the next address to read is adjusted by the run-ahead value, thereby generating an adjusted next address to read. Once the next address to read has been determined the method 74 may proceed to resume the halted copying operation. Copying of the second number of bytes from the second memory locations to the second memory destinations then proceeds based at least upon the adjusted next address to read, the next address to write, and the quantity information. The method 74 ends at 90.

Figure 7:
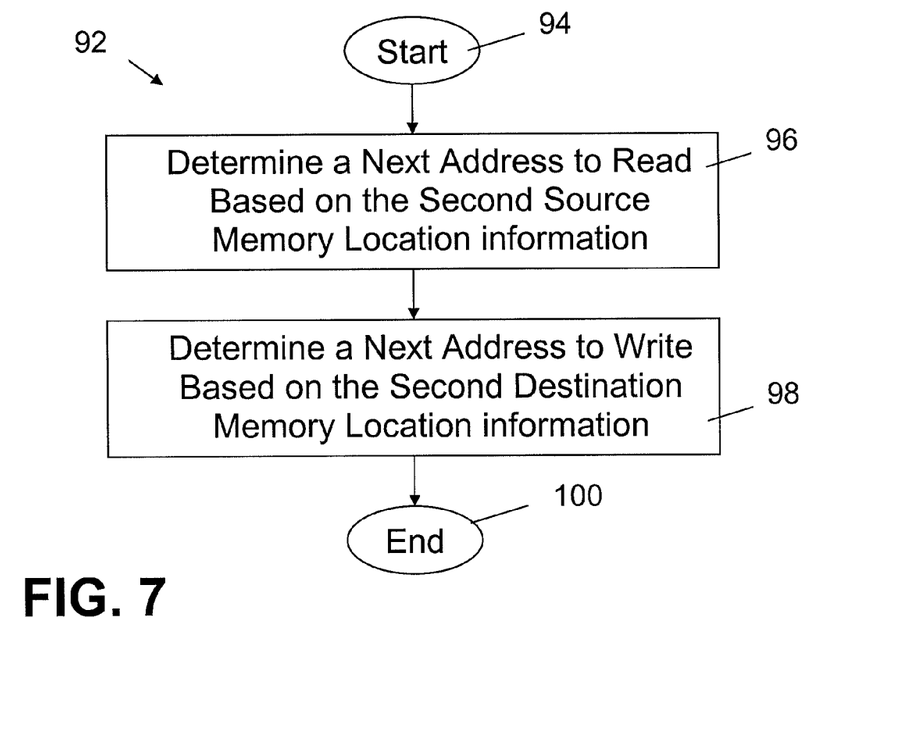
FIG. 7 is a flow diagram illustrating a third contemplated variation of the method illustrated in FIGS. 1-3.

FIG. 7 provides a flow diagram for a third embodiment of the method of the invention. This method is referred to as the "restartable stop" method 92. As indicated in FIG. 7, the method 92 begins at 94. The method 92 then proceeds to 96 where a next address to read from the second source memory location information is determined. Then, at 98, a next address to write from the second destination memory location information is determined. With these two bits of information, copying of the second number of bytes from the second memory locations to the second memory destinations may be resumed using the next address to read, the next address to write, and the quantity information. The method 92 ends at 100.

Figure 8:
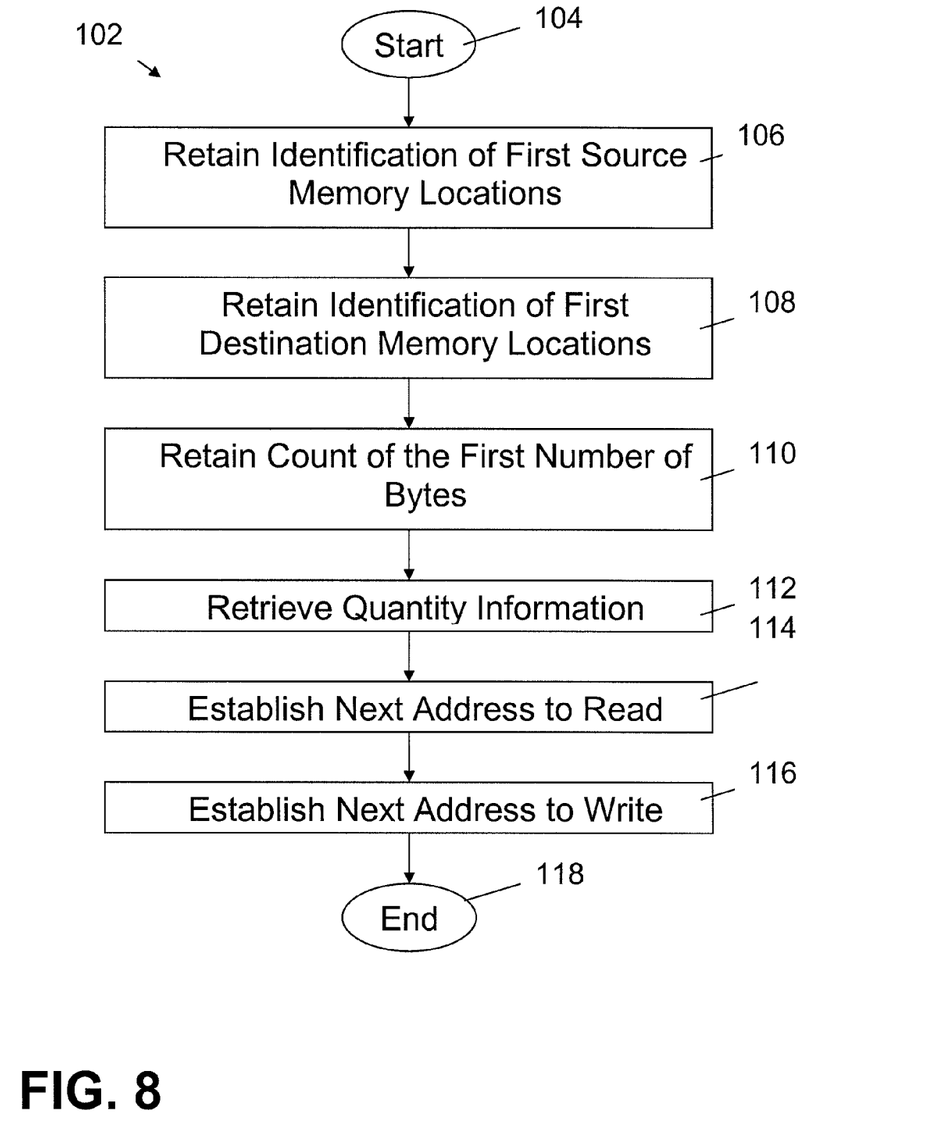
FIG. 8 is a flow diagram illustrating a fourth contemplated variation of the method illustrated in FIGS. 1-3.

FIG. 8 provides a flow diagram for a method referred to herein as the "simple" method 102. The simple method 102 is the fourth embodiment of a method for resuming the halted copying instruction. The method 102 also is intended to begin after the operation 40, detailed in FIG. 3.

With reference to FIG. 8, the simple method 102 begins at 104. From 104, the method 102 proceeds to 106 where an identification of the first source memory locations is retained. Then, at 108, an identification of the first destination memory locations is retained. Following this, at 110, a count of the first number of bytes is retained. At a subsequent moment in time, prior to resuming the halted copying operation, the method 102 retrieves the quantity information at 112. At 114, the method 102 establishes a next address to read at least based upon the identification of the first source memory locations, the count of the first number of bytes, and the quantity information. At 116, the method 102 establishes a next address to write at least based upon the identification of the first destination memory locations, the count of the first number of bytes, and the quantity information. From this, the method 102 may resume the halted copying. The resumed copying in this method relies at least upon the next address to read, the next address to write, the count of the first number of bytes, and the quantity information. The method 102 ends at 118.

Figure 9:
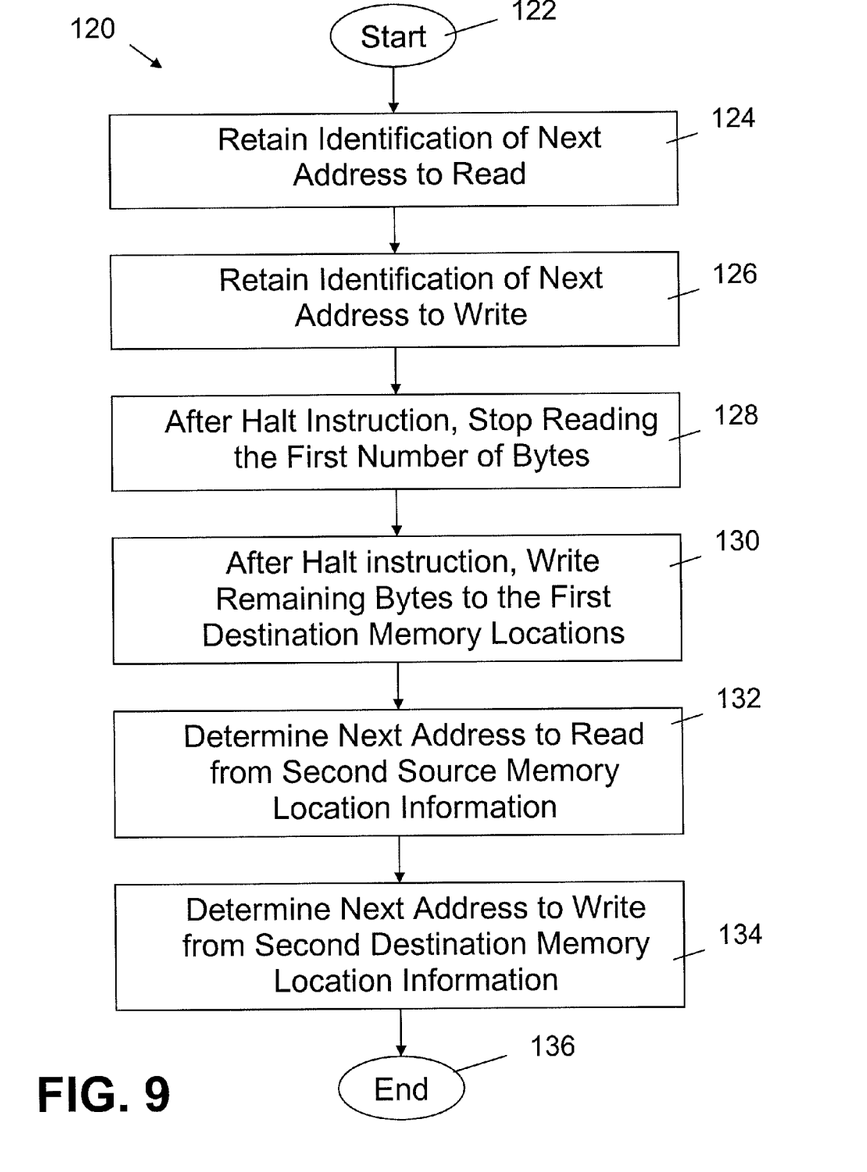
FIG. 9 is a flow diagram illustrating a fifth contemplated variation of the method illustrated in FIGS. 1-3.

FIG. 9 illustrates a method 120, which is referred to herein as the "drain" method. This is a fifth embodiment contemplated to fall within the scope of the invention. Like the method 102, the drain method 120 is intended to follow the method 10 illustrated in FIGS. 1-3.

As illustrated in FIG. 9, the drain method 120 begins at 122. At 124, the method 120 retains an indication of the next address to read. At 126, the method 120 retains an indication of the next address to write. At 128, after the halt instruction, the method 120 stops reading of the first number of bytes from the first source memory locations. At 130, the method 120 stops writing any bytes to the first destination memory locations that remain from the bytes read before stopping the reading. Then, at 132, the method 120 determines a next address to read from the second source memory location information. At 134, a next address to write from the second destination memory location information is determined. As a result, copying of the second number of bytes from the second memory locations to the second memory destinations may proceed at least based upon the next address to read, the next address to write, and the quantity information. The method 120 ends at 136.

As noted above, the method of the invention may be applied in the context of scatter and/or gather operations. In the gather context, the method may include an operation where the first number of bytes are retrieved from the first source memory locations, which are distributed in a plurality of buffers. Then, the first number of bytes may be buffered into a single data stream. A scatter operation may be employed after this. If so, the method may include the additional operation of providing the first number of bytes to the first destination memory locations from the single data stream. In this context, the first destination memory locations may be distributed in a plurality of buffers. Alternatively, a gather operation may pull information from a plurality of first destination memory locations directly. Distribution may then be directed to a plurality of buffers.

As noted above, the invention has been described in connection with several specific embodiments. It is not intended for the invention to be limited solely to the embodiments described. To the contrary, the invention is intended to encompass any equivalents and variations, as should be apparent to those skilled in the art.

What is claimed is:

1. A method of operating a direct memory access (DMA) engine, comprising:
   initiating a single block-transfer DMA operation to copy a first number of bytes from first source memory locations to first destination memory locations;
   subsequently issuing a halt instruction before the first number of bytes are completely copied from the first source memory locations to the first destination memory locations;
   in response to the halt instruction,
      halting the copying before the first number of bytes are completely copied from the first source memory locations to the first destination memory locations thereby establishing a second number of bytes, which include those bytes remaining to be copied from the first number of bytes;
      identifying a quantity of the second number of bytes;
      generating quantity information regarding the quantity of the second number of bytes;
      storing the quantity information;
      identifying second source memory locations in which the second number of bytes are stored;
      generating second source memory location information encompassing the second source memory locations in which the second number of bytes are stored;
      storing the second source memory location information;
      identifying second destination memory locations into which the second number of bytes are to be transferred;
      generating second destination memory location information encompassing the second destination memory locations into which the second number of bytes are to be stored; and
      storing the second destination memory location information; and
   resuming the halted transfer by initiating copying of the second number of bytes from the second source memory locations to the second destination memory locations.

2. The method of claim 1, further comprising:
   retaining an identification of the first source memory locations;

retaining an identification of the first destination memory locations;
retaining a count of the first number of bytes;
retrieving the quantity information;
establishing a next address to read at least based in part on the identification of the first source memory locations, the count of the first number of bytes, and the quantity information; and
establishing a next address to write at least based in part on the identification of the first destination memory locations, the count of the first number of bytes, and the quantity information,
wherein copying the second number of bytes from the second memory locations to the second memory destinations relies at least in part on the next address to read, the next address to write, the count of the first number of bytes, and the quantity information.

3. The method of claim 1, further comprising:
retaining an indication of the next address to read;
retaining an indication of the next address to write;
after issuance of the halt instruction:
stopping a read operation of the first number of bytes from the first source memory locations;
writing any bytes to the first destination memory locations that remain from the bytes read before stopping the read operation,
determining a next address to read from the second source memory location information; and
determining a next address to write from the second destination memory location information,
wherein copying the second number of bytes from the second memory locations to the second memory destinations relies at least in part on the next address to read, the next address to write, and the quantity information.

4. The method of claim 1, further comprising:
retrieving the first number of bytes from the first source memory locations, wherein the first source memory locations are distributed in a plurality of buffers; and
funneling the first number of bytes into a single data stream.

5. The method of claim 1, further comprising:
providing the first number of bytes to the first destination memory locations from a single data stream,
wherein the first destination memory locations are distributed in a plurality of buffers.

6. The method of claim 1, further comprising:
retrieving the quantity information;
retrieving the second source memory location information; and
retrieving the second destination memory location information,
wherein the quantity information, the second source memory location information, and the second destination memory location information are read from at least one register in the direct memory access engine.

7. The method of claim 6, wherein the at least one register comprises a plurality of registers, and wherein the plurality of registers comprise:
at least one source register in which the first source memory locations are retained; and
at least one destination register in which the first destination memory locations are retained.

8. The method of claim 7, wherein the plurality of registers further comprise:
a quantity register in which the quantity information is stored.

9. The method of claim 6, wherein the copying of the second number of bytes from the second source memory locations to second destination memory locations uses the quantity information, the second source memory location information, and the second destination memory location information.

10. The method of claim 9, further comprising:
determining a next address to read from the second source memory location information;
determining a next address to write from the second destination memory location information;
flushing all pending reads and writes;
determining a decrement value identifying a number of bytes by which the next address to read is in advance of the next address to write; and
decrementing the next address to read by the decrement value, thereby generating a decremented read address,
wherein copying the second number of bytes from the second memory locations to the second memory destinations proceeds based at least in part on the decremented read address, the next address to write, and the quantity information.

11. The method of claim 9, further comprising:
determining a next address to read from the second source memory location information;
determining a next address to write from the second destination memory location information;
tracking a number of bytes by which the next address to read is in advance of the next address to write, thereby establishing a run-ahead value;
storing the run-ahead value;
retrieving the run-ahead value; and
adjusting the next address to read by the run-ahead value, thereby generating an adjusted next address to read,
wherein copying the second number of bytes from the second memory locations to the second memory destinations proceeds based at least in part on the adjusted next address to read, the next address to write, and the quantity information.

12. The method of claim 9, further comprising:
determining a next address to read from the second source memory location information; and
determining a next address to write from the second destination memory location information,
wherein copying the second number of bytes from the second memory locations to the second memory destinations proceeds based on the next address to read, the next address to write, and the quantity information.

13. A communication device, comprising:
a source memory including first source memory locations and second source memory locations;
a destination memory including first destination memory locations and second destination memory locations; and
a direct memory access (DMA) engine coupled to the source memory and the destination memory and configured to:
initiate a single block-transfer DMA operation to copy a first number of bytes from the first source memory locations to the first destination memory locations;
subsequently issue a halt instruction before the first number of bytes are completely copied from the first source memory locations to the first destination memory locations;
in response to the halt instruction,
halt copying before the first number of bytes are completely copied from the first source memory locations to the first destination memory locations thereby establishing a second number of bytes, which include those bytes remaining to be copied from the first number of bytes;

identify a quantity of the second number of bytes;

generate quantity information regarding the quantity of the second number of bytes;

store the quantity information;

identify the second source memory locations in which the second number of bytes are stored;

generate second source memory location information encompassing the second source memory locations in which the second number of bytes are stored;

store the second source memory location information;

identify the second destination memory locations into which the second number of bytes are to be transferred;

generate second destination memory location information encompassing the second destination memory locations into which the second number of bytes are to be stored; and store the second destination memory location information; and resume the halted transfer by initiating copying of the second number of bytes from the second source memory locations to the second destination memory locations.

14. The communication device of claim 13, wherein the DMA engine is further configured to:

retain an identification of the first source memory locations;

retain an identification of the first destination memory locations;

retain a count of the first number of bytes;

retrieve the quantity information;

establish a next address to read at least based in part on the identification of the first source memory locations, the count of the first number of bytes, and the quantity information; and establish a next address to write at least based in part on the identification of the first destination memory locations, the count of the first number of bytes, and the quantity information, wherein copying the second number of bytes from the second memory locations to the second memory destinations relies at least in part on the next address to read, the next address to write, the count of the first number of bytes, and the quantity information.

15. The communication device of claim 13, wherein the DMA engine is further configured to:

retain an indication of the next address to read;

retain an indication of the next address to write;

after issuance of the halt instruction:

stop a read operation of the first number of bytes from the first source memory locations; and write any bytes to the first destination memory locations that remain from the bytes read before stopping the read operation, determine a next address to read from the second source memory location information; and determine a next address to write from the second destination memory location information, wherein copying the second number of bytes from the second memory locations to the second memory destinations relies at least in part on the next address to read, the next address to write, and the quantity information.

16. The communication device of claim 13, wherein the DMA engine is further configured to:

retrieve the first number of bytes from the first source memory locations, wherein the first source memory locations are distributed in a plurality of buffers; and funnel the first number of bytes into a single data stream.

17. The communication device of claim 13, wherein the DMA engine is further configured to:

provide the first number of bytes to the first destination memory locations from a single data stream, wherein the first destination memory locations are distributed in a plurality of buffers.

18. The communication device of claim 13, wherein the DMA engine is further configured to:

retrieve the quantity information;

retrieve the second source memory location information; and retrieve the second destination memory location information, wherein the quantity information, the second source memory location information, and the second destination memory location information are read from at least one register in the direct memory access engine.

19. The communication device of claim 18, wherein the at least one register comprises a plurality of registers, and the plurality of registers comprise:

at least one source register in which the first source memory locations are retained; and at least one destination register in which the first destination memory locations are retained.

20. The communication device of claim 18, wherein the plurality of registers further comprise:

a quantity register in which the quantity information is stored.

21. The communication device of claim 18, wherein the copying of the second number of bytes from the second source memory locations to the second destination memory locations uses the quantity information, the second source memory location information, and the second destination memory location information.

22. The communication device of claim 21, wherein the DMA engine is further configured to:

determine a next address to read from the second source memory location information;

determine a next address to write from the second destination memory location information;

flush all pending reads and writes;

determine a decrement value identifying a number of bytes by which the next address to read is in advance of the next address to write; and decrement the next address to read by the decrement value, thereby generating a decremented read address, wherein copying the second number of bytes from the second memory locations to the second memory destinations proceeds based at least in part on the decremented read address, the next address to write, and the quantity information.

23. The communication device of claim 21, wherein the DMA engine is further configured to:

determine a next address to read from the second source memory location information;

determine a next address to write from the second destination memory location information;

track a number of bytes by which the next address to read is in advance of the next address to write, thereby establishing a run-ahead value;

store the run-ahead value;

retrieve the run-ahead value; and adjust the next address to read by the run-ahead value, thereby generating an adjusted next address to read, wherein copying the second number of bytes from the second memory locations to the second memory destinations proceeds based at least in part on the adjusted next address to read, the next address to write, and the quantity information.

24. The communication device of claim 21, wherein the DMA engine is further configured to:

determine a next address to read from the second source memory location information; and determine a next address to write from the second destination memory location information, wherein copying the second number of bytes from the second memory locations to the second memory destinations proceeds based on the next address to read, the next address to write, and the quantity information.

25. A computer program product for processing data for a program configured to directly access a memory, the computer program product comprising:

a non-transitory computer-readable medium having stored thereon code for causing a computer to:

initiate a single block-transfer direct memory access (DMA) operation to copy a first number of bytes from first source memory locations to first destination memory locations;

subsequently issue a halt instruction before the first number of bytes are completely copied from the first source memory locations to the first destination memory locations;

in response to the halt instruction, halt copying before the first number of bytes are completely copied from the first source memory locations to the first destination memory locations thereby establishing a second number of bytes, which include those bytes remaining to be copied from the first number of bytes;

identify a quantity of the second number of bytes;

generate quantity information regarding the quantity of the second number of bytes;

store the quantity information;

identify second source memory locations in which the second number of bytes are stored;

generate second source memory location information encompassing the second source memory locations in which the second number of bytes are stored;

store the second source memory location information;

identify second destination memory locations into which the second number of bytes are to be transferred;

generate second destination memory location information encompassing the second destination memory locations into which the second number of bytes are to be stored; and store the second destination memory location information; and resume the halted transfer by initiating copying of the second number of bytes from the second source memory locations to the second destination memory locations.

26. A communication device, comprising:

means for initiating a single block-transfer direct memory access (DMA) operation to copy a first number of bytes from first source memory locations to first destination memory locations;

means for subsequently issuing a halt instruction before the first number of bytes are completely copied from the first source memory locations to the first destination memory locations;

means for halting the copying, in response to the halt instruction, before the first number of bytes are completely copied from the first source memory locations to the first destination memory locations thereby establishing a second number of bytes defined by when the halt instruction is received, which include those bytes remaining to be copied from the first number of bytes;

means for identifying, in response to the halt instruction, a quantity of the second number of bytes;

means for generating, in response to the halt instruction, quantity information regarding the quantity of the second number of bytes;

means for storing, in response to the halt instruction, the quantity information;

means for identifying, in response to the halt instruction, second source memory locations in which the second number of bytes are stored;

means for generating, in response to the halt instruction, second source memory location information encompassing the second source memory locations in which the second number of bytes are stored;

means for storing, in response to the halt instruction, the second source memory location information;

means for identifying, in response to the halt instruction, second destination memory locations into which the second number of bytes are to be transferred;

means for generating, in response to the halt instruction, second destination memory location information encompassing the second destination memory locations into which the second number of bytes are to be stored; and means for storing, in response to the halt instruction, the second destination memory location information; and means for resuming the halted transfer by initiating copying of the second number of bytes from the second source memory locations to the second destination memory locations.

27. The communication device of claim 26, wherein the means for initiating copying, the means for issuing a halt instruction, the means for halting the copying, the means for identifying a quantity of the second number of bytes, the means for generating quantity information, the means for storing the quantity information, the means for identifying second source memory locations, the means for generating second source memory location information, the means for storing the second source memory location information, the means for identifying second destination memory, the means for generating second destination memory location information, and the means for storing the second destination memory location comprise a direct memory access (DMA) engine.

* * * * *